(12) United States Patent
Jeong et al.

(10) Patent No.: US 9,141,498 B2
(45) Date of Patent: Sep. 22, 2015

(54) METHOD FOR VERIFICATION OF RECONFIGURABLE PROCESSOR

(71) Applicants: SAMSUNG ELECTRONICS CO., LTD., Suwon-si (KR); SEOUL NATIONAL UNIVERSITY R&DB FOUNDATION, Seoul (KR)

(72) Inventors: Seong-hoon Jeong, Seoul (KR); Bernhard Egger, Seoul (KR); Daeyong Shin, Seoul (KR); Changyeon Jo, Seoul (KR)

(73) Assignees: SAMSUNG ELECTRONICS CO., LTD., Suwon-si (KR); SEOUL NATIONAL UNIVERSITY R&DB FOUNDATION, Seoul (KR)

(*) Notice: Subject to any disclaimer, the term of this patent is extended or adjusted under 35 U.S.C. 154(b) by 106 days.

(21) Appl. No.: 14/020,061

(22) Filed: Sep. 6, 2013

(65) Prior Publication Data
US 2014/0075253 A1 Mar. 13, 2014

(30) Foreign Application Priority Data
Sep. 7, 2012 (KR) .................. 10-2012-0099526

(51) Int. Cl.
*G06F 11/22* (2006.01)
*G06F 11/263* (2006.01)

(52) U.S. Cl.
CPC .......... *G06F 11/2273* (2013.01); *G06F 11/263* (2013.01); *G06F 2217/68* (2013.01)

(58) Field of Classification Search
CPC ............... G01R 31/318342; G06F 17/5022; G06F 11/2273; G06F 11/263; G06F 17/5027; G06F 17/5045; G06F 17/5054; G06F 2217/68
USPC .......................................................... 714/741
See application file for complete search history.

(56) References Cited

U.S. PATENT DOCUMENTS

| | | | |
|---|---|---|---|
| 5,572,666 A | 11/1996 | Whitman | |
| 5,758,123 A * | 5/1998 | Sano et al. ................. | 703/22 |
| 6,167,364 A * | 12/2000 | Stellenberg et al. .......... | 703/19 |
| 6,197,605 B1 * | 3/2001 | Simunic et al. .............. | 438/14 |
| 6,754,867 B2 | 6/2004 | Ojha et al. | |
| 6,871,298 B1 | 3/2005 | Cavanaugh et al. | |
| 6,948,096 B2 * | 9/2005 | Parvathala et al. ............ | 714/30 |
| 7,493,542 B2 | 2/2009 | Farkas et al. | |
| 7,523,367 B2 * | 4/2009 | Fagerness et al. ............ | 714/719 |
| 8,868,396 B1 * | 10/2014 | Shirazi et al. ............... | 703/14 |
| 2004/0153928 A1 * | 8/2004 | Rohrbaugh et al. .......... | 714/738 |
| 2007/0192753 A1 | 8/2007 | Lam et al. | |
| 2011/0047428 A1 * | 2/2011 | Kikta et al. .................. | 714/733 |

* cited by examiner

*Primary Examiner* — Cynthia Britt
(74) *Attorney, Agent, or Firm* — Sughrue Mion, PLLC

(57) ABSTRACT

A method for verifying an operation of a reconfigurable processor is provided. The method includes generating a random test program using a test description and an architecture description, executing the generated random test program in the reconfigurable processor and in a simulator, and then comparing types of output values in the execution result.

20 Claims, 4 Drawing Sheets

FIG. 4

Schedule

| cycle | FU0 | FU1 | ... |
|---|---|---|---|
| 0 | add_i r3 ← r1, r2 | sub_f r2 ← r3, r4 | |
| 1 | add_f r1 ← r3, r1 | nop | |
| 2 | | | |
| 3 | | | |
| 4 | | | |
| 5 | | | |
| 6 | | | |
| ... | | | |

Value Type Tracker

| cycle | FU0 | FU1 | ... | reg1 | reg2 | reg3 | reg4 | ... |
|---|---|---|---|---|---|---|---|---|
| 0 | n/a | n/a | | int | int | float | int | |
| 1 | int | n/a | | int | int | int | int | |
| 2 | n/a | float | | int | float | int | | |
| 3 | float | | | float | | | | |
| 4 | | | | | | | | |
| 5 | | | | | | | | |
| 6 | | | | | | | | |
| ... | | | | | | | | |

METHOD FOR VERIFICATION OF RECONFIGURABLE PROCESSOR

CROSS-REFERENCE TO RELATED APPLICATION

This application claims priority from Korean Patent Application No. 10-2012-0099526, filed on Sep. 7, 2012, the entire disclosure of which is incorporated herein by reference for all purposes.

BACKGROUND

1. Field

Methods consistent with the following description relate to verification of reconfigurable processors.

2. Description of the Related Art

A reconfigurable architecture refers to a spatial structure of a device that will be modified so as to be optimized for a specific operation.

Performing an operation using only a hardware configuration is not efficient and cannot properly respond to changing operations of the hardware. By contrast, in the case where an operation is performed using only a software configuration, it is possible to modify the software to match changing operations, but an operation speed would be slower than when only a hardware configuration is used.

However, a reconfigurable architecture takes the advantages of both hardware and software. In particular, the reconfigurable architecture is considered useful in digital signal processing which requires the same operation to be performed repeatedly.

There are many kinds of the reconfigurable architectures. A case in point is Coarse-Grained Array which consists of functional units connected to each other. In order to match an operation to be executed, the Coarse-Grained Array changes the way functional units are connected to each other to thereby be optimized for the operation.

A test program is utilized to verify the reconfigurable architecture. For example, Constraint Satisfaction Problems (CSPs) may be used as a test program. CSPs are mathematical problems defined as a set of objects whose state must satisfy a number of constraints or limitations. CSPs represent the entities in a problem as a homogeneous collection of finite constraints over variables, which are solved by constraint satisfaction methods.

However, related art test programs, such as CSPs, require both syntactic and semantic knowledge of an instruction.

In addition, while there are a number of functional units (FUs) in a reconfigurable processor, a CSP has thousands of constraints. Thus, it may be infeasible to verify the reconfigurable processor, which has a set of distinctive instructions, using a CSP.

SUMMARY

One or more embodiments provide a random test method and a random test apparatus for verification of a reconfigurable processor.

According to an aspect of an exemplary embodiment, there is provided a method for verification of a reconfigurable processor, the method including generating a test description and an architecture description; generating a test program based on the architecture description and the test description; executing the test program in a reconfigurable processor; executing the test program in a simulator; and verifying the reconfigurable processor by determining whether a type of an output value and an input value in results of executing the test program in the reconfigurable processor is the same as a type of an output value and input value in results of executing the test program in the simulator.

The architecture description may include interconnections between Functional Units (FUs) and a register file in the reconfigurable processor, a register location where a specific type value is stored, and an instruction set of the reconfigurable processor.

The generating of the test program may comprise generating a random test program based on the test description.

The verifying of the reconfigurable processor may include tracking a value type of the register value and a value type of an output value of the FUs; and verifying the reconfigurable processor by comparing the tracked value type of the register value and the tracked value type of the output value of the FUs.

The verifying of the reconfigurable processor may comprise verifying an operation of the reconfigurable processor by comparing the tracked value type of the register value and the tracked value type of the output values of the FUs during a given cycle.

According to an aspect of another exemplary embodiment, there is provided a method for verification of a reconfigurable processor, the method including generating a random test program based on an architecture description and a test description; executing the random test program in a reconfigurable processor that comprises functional units whose configuration is modifiable in order to optimize the reconfigurable processor for a specific operation; executing the random test program in a simulator comprising at least one register for simulating the reconfigurable processor; and verifying operation of the reconfigurable processor by determining whether a type of an output value in results after executing the random test program in the reconfigurable processor is the same as a type of an output value in results after executing the random test program in the simulator.

According to an aspect of another exemplary embodiment, there is provided a method for verification of a reconfigurable processor, the method including generating an architecture description of the reconfigurable processor; generating a test description for the reconfigurable processor, the test description including constraints set by a user wherein the constraints include syntactical information about a plurality of test instructions but do not designate specific values of operands for the instructions; generating a random test program using the architectural description and the test description; executing the random test program in a reconfigurable processor; executing the random test program in a simulator for simulating the reconfigurable processor; and verifying operation of the reconfigurable processor by determining whether a type of an output value in results of executing the random test program in the reconfigurable processor is the same as a type of an output value in results of executing the random test program in the simulator.

BRIEF DESCRIPTION OF THE DRAWINGS

The accompanying drawings, which are included to provide a further understanding of the present inventive concept and are incorporated in and constitute a part of this specification, illustrate exemplary embodiments, and together with the description serve to explain the principles of the prevent inventive concept.

FIG. 4 is a diagram illustrating of an example of verification of a reconfigurable processor using a value type tracking method rather than a value tracking method according to an exemplary embodiment.

DETAILED DESCRIPTION

Figure 1:
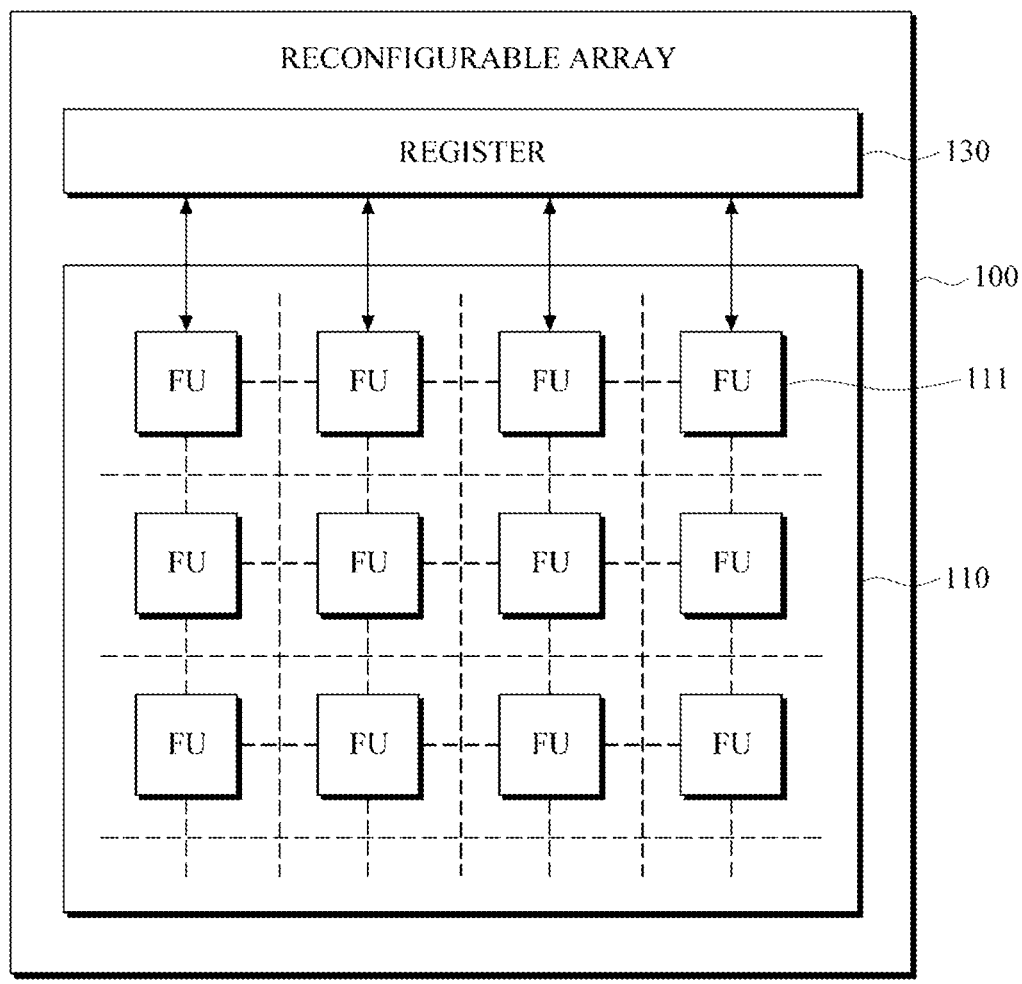
FIG. 1 is a schematic view illustrating a configuration of a reconfigurable processor according to an exemplary embodiment.

The following description is provided to assist the reader in gaining a comprehensive understanding of the methods, apparatuses, and/or systems described herein. Accordingly, various changes, modifications, and equivalents of the methods, apparatuses, and/or systems described herein will suggest themselves to those of ordinary skill in the art. Also, descriptions of well-known functions and constructions may be omitted for increased clarity and conciseness.

Throughout the drawings and the detailed description, unless otherwise described, the same drawing reference numerals will be understood to refer to the same elements, features, and structures. The relative size and depiction of these elements may be exaggerated for clarity, illustration, and convenience.

FIG. 1 is a diagram illustrating a configuration of a reconfigurable processor according to an exemplary embodiment.

Referring to FIG. 1, the reconfigurable processor 100 includes a reconfigurable array 110 and a register file 130.

The reconfigurable array 110 includes a plurality of Functional Units (FUs) 111. The reconfigurable array 110 may modify a hardware configuration to perform an operation optimally. For example, the reconfigurable array 110 may modify the way a plurality of FUs 111 are connected to each other, according to a type of an operation.

The register file 130 helps the FUs 111 to transfer data to execute an instruction. The register file 130 may also store the data. For example, each of the FUs 111 is able to access the register file 130 to thereby read or write data for executing an instruction. However, since the reconfigurable array 110 is reconfigured, the connections between the FUs 111 change. Thus, an individual FU 111 might not be connected to each of the other FUs. Thus, depending on the configuration, a given FU may access the register file 130 via another FU.

Each of the FUs 111 may execute an assigned instruction. The way the FUs are connected to each other and the operation order of the FUs may change according to an operation to be processed.

Figure 2:
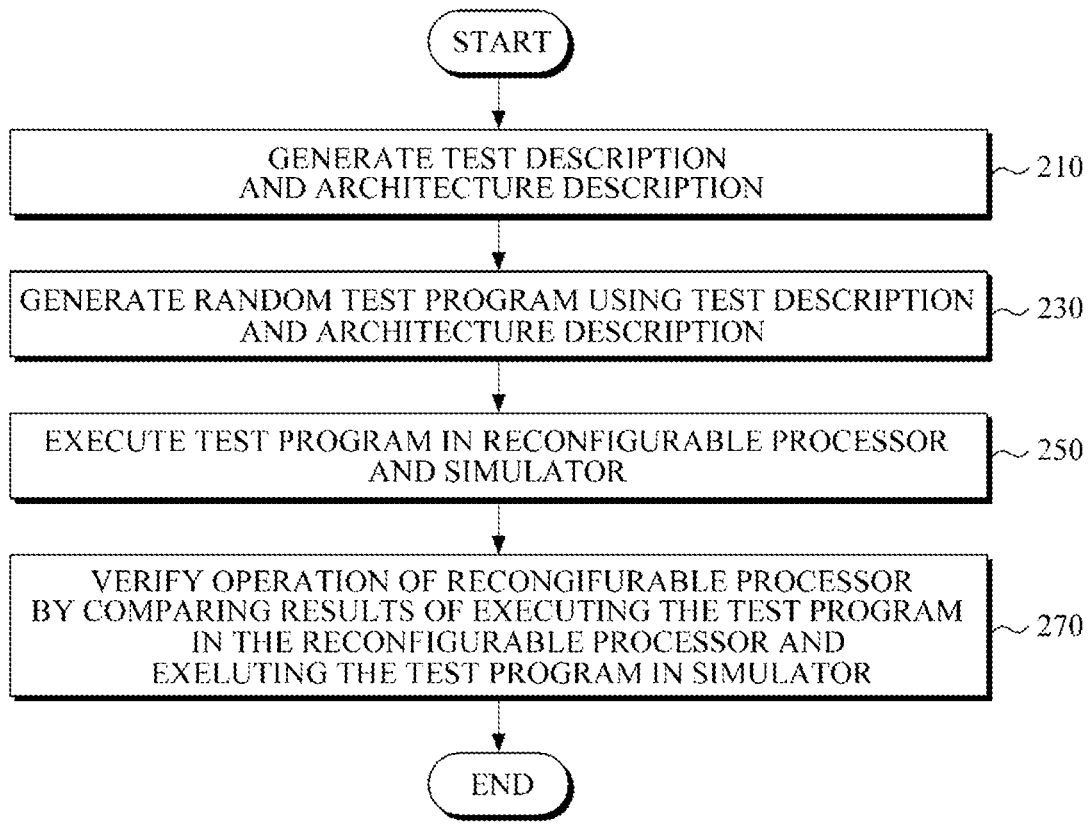
FIG. 2 is a flow chart illustrating a method for verification of a reconfigurable processor according to an exemplary embodiment.

FIG. 2 is a flow chart illustrating a method for verification of a reconfigurable processor according to an exemplary embodiment.

Referring to FIG. 2, the method for verification of a reconfigurable processor includes generating a test description and an architecture description in 210, generating a test program based on the test description and the architecture description in 230, executing the test program in a reconfigurable processor and a simulator in 250, and verifying the reconfigurable processor by comparing the results of executing the test program in the reconfigurable processor and the simulator in 290.

A test description includes constraints set by a user, such as a type and a weight of a test instruction, a test execution cycle length and a test schedule.

In addition, an architecture description includes interconnection between FUs (i.e., how the FUs are interconnected) and a register file in a reconfigurable processor, a register location where a specific type value is stored, and an instruction set of the reconfigurable processor.

A random test program is generated according to a type and a weight of an instruction set by constraints. That is, a random test description is generated according to a weight of an instruction. At this time, a specific input value or output value of an operation is not required, but a type of an input value is set as a constraint.

The verifying of the reconfigurable processor may include tracking a value type of a register value and a value type of an FU output value in 270, and verifying the reconfigurable processor by comparing the tracked value type of the register value and the tracked value type of an FU output value in 270. In the exemplary embodiment described herein the types that are tracked are integers (i.e., int) and floating point number (i.e., float) types. However, the types are not limited to these, and the types that may be tracked are not particularly limited. For example, the types may include integers, floating points, characters, unsigned integers, doubles, long long, short, etc.

Figure 3:
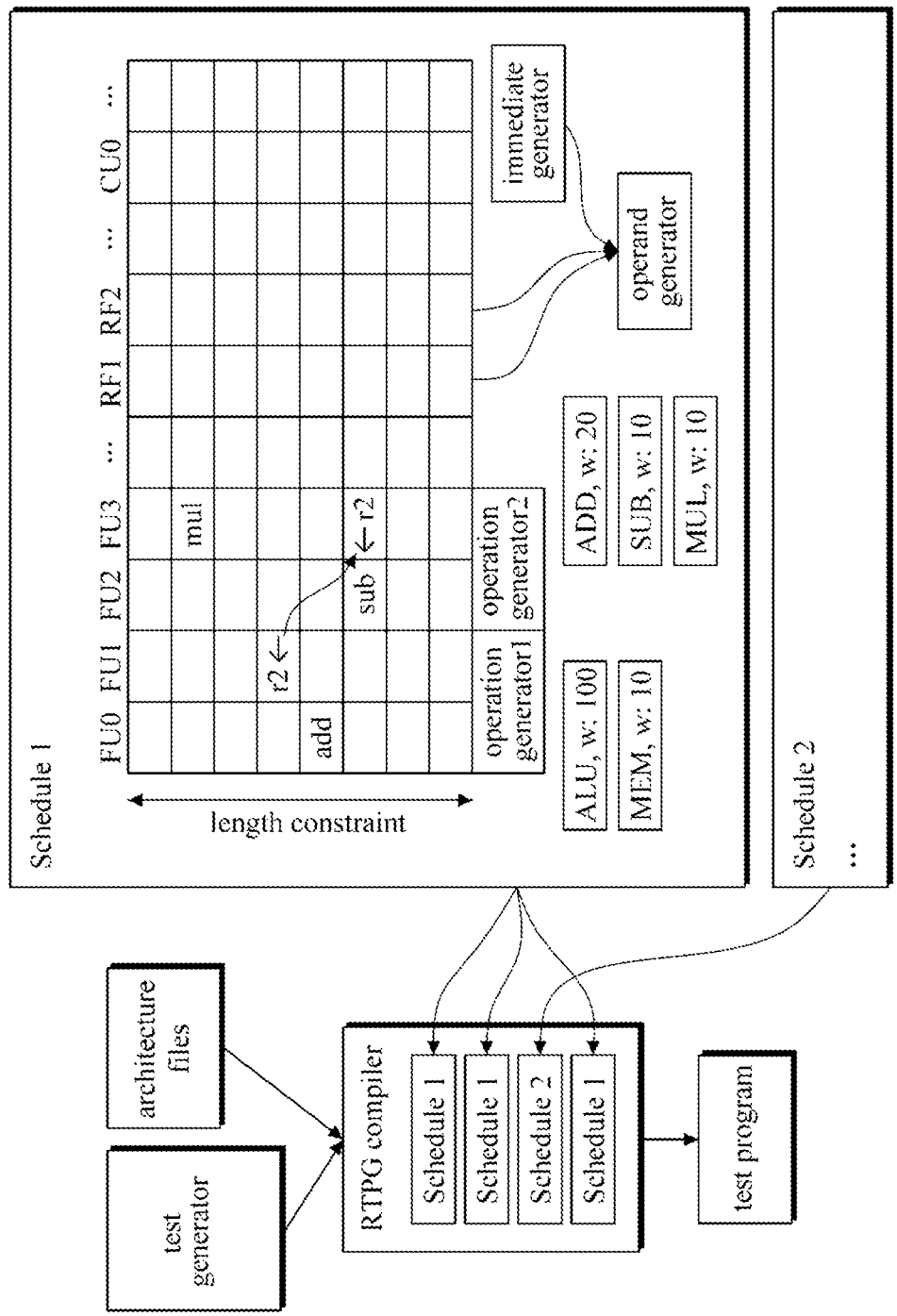
FIG. 3 is a diagram illustrating an example of generating a test program for verification of a reconfigurable processor according to an exemplary embodiment.

FIG. 3 is a diagram illustrating an example of generating a test program to verify a reconfigurable processor according to an exemplary embodiment.

Referring to FIG. 3, if a user sets a type and a weight of an operation as constraints, a random combination of operations are generated according to weights of the operations.

In addition, a compiler generates a test program based on the architecture description. Specifically, the compiler generates a test program based on interconnection between FUs and a register file as well as a register location where a specific type value is stored.

With reference to FIG. 3, a type of an instruction is determined to be one of, for example, ALU, MEM, ADD, SUB and MUL according to constraints set by a user, and a different weight is given to each instruction.

If a test schedule is generated, a complier generates a test program based on the architecture description. Specifically, an instruction to be executed in each FU, and a type thereof, may be assigned to each instruction execution cycle, an operand of each instruction may be generated, and an output value of the instruction may be assigned.

Syntactical knowledge of an instruction is used to generate a test program, but semantic knowledge is not essential. That is, a user is not required to designate a specific value to be an operand of an operation as a constraint.

A register location in which a value of data is stored may be designated in advance according to a value type of the data.

FIG. 4 is a diagram illustrating an example of verification of a reconfigurable processor using a value type tracking method according to an exemplary embodiment.

Referring to FIG. 4, value types of input and output values are tracked when a test program is being executed in a reconfigurable processor and a simulator. Specifically, a value type of a register value and a value type of an FU output value are compared between the simulator and the reconfigurable processor.

For example, an integer add operation uses an integer output value and integer input values, and therefore whether an output value and an input value of an integer operation, performed in the reconfigurable processor and the simulator during the same cycle, are integers is determined.

An operation of a reconfigurable processor may be verified by comparing a value type of a register value and a value type of an FU output value at cycle intervals or upon termination of execution of a test program. For example, an integer operation is performed at cycle 0 with operands of reg 1 and reg 2, and the result is stored in reg 3. That is, an operation of a reconfigurable processor may be verified by tracking a value type of an output value of FU0 and value types of register values of reg 1 and reg 2 in a simulator and a reconfigurable processor at cycle 9 and then comparing the tracked value types.

In other words, it is possible to verify an operation of a reconfigurable processor using a syntactical knowledge of an instruction without semantic knowledge.

Referring more specifically to FIG. 4, FIG. 4 shows an example schedule of operations for FU0 and FU1, along with an example of the results of the value type tracker.

A result value type of the integer operation "add_i" is integer. In the example schedule of FIG. 4, it is assumed that the operation "add_i" has a latency of 1 cycle. A result value type of the float operation "sub_f" is float, and a result value type of the float operation "add_f" is float. In the example schedule of FIG. 4, it is assumed that the operations "sub_f" and "add_f" each has a latency of 2 cycles. In FIG. 4, "nop" means no operation.

Referring to the example schedule of FIG. 4, FU0 executes "add_i r3←r1, r2" at cycle 0. Here, "add_i r3←r1, r2" means that the value of register 1 and register 2 are added and the result is stored in register 3. Since "add_i r3←r1, r2" has a latency of 1 cycle, the result is output at cycle 2. After that, FU0 executes "add_f r1←r3, r1" at cycle 1. Since "add_f r1←r3, r1" has a latency of 2 cycles, the result is output at cycle 3. Similarly, FU1 executes "sub_f r2←r3, r4" at cycle 0 and outputs a result of "sub_f r2←r3, r4" at cycle 2.

Turning to the example Value Type Tracker in FIG. 4, the Value Type Tracker tracks a value type of a register value and a value type of an FU output value. Thus, based on the above discussed schedule, the output value type of FU0 at cycle 0 and the output value types of FU1 at cycle 0 and cycle 1 are "n/a," because the FU0 outputs the result of "add_i r3←r1, r2" at cycle 1 and the FU1 outputs the result of "sub_f r2←r3, r4" at cycle 2. The output value type of FU0 at cycle 2 is "n/a" and the output value of FU0 at cycle 3 is "float," because the operation "add_f r1←r3, r1" has a latency of 2 cycles.

At cycle 0, the value types of reg1, reg2, reg3 and reg4 are initialized. In this case, they are initialized with integer (int), int, float, and int, respectively. At cycle 1, a result of "add_i r3←r1, r2" is stored into reg 3. Thus, the value type of reg 3 is changed to "int" at cycle 1. At cycle 2, a result of "sub_f r2←r3, r4" is stored into reg 2. Thus, the value type of reg 2 is changed to "float" at cycle 2. At cycle 3, a result of "add_f r1←r3, r1" is stored into reg 1. Therefore, the value type of reg 1 is changed to "float" at cycle 3, and so on.

As discussed above, the exemplary embodiment shown in FIG. 4 tracks types of integer and float. However, according to other exemplary embodiments, different or additional types may be tracked. The types are not particularly limited, and for example, may include integer, float, character, unsigned int, double, long long, short, etc.

According to an exemplary embodiment, a random test program which does not require semantic knowledge is generated, thereby reducing user constraints. In addition, such a random test program may verify a reconfigurable processor using a value type tracking method, rather than a value tracking method.

Exemplary embodiments may be realized using computer-readable codes in a computer-readable recording medium. The computer-readable recording medium includes all types of recording devices which stores computer-system readable data.

Examples of the computer-readable recording medium includes a Read Only Memory (ROM), a Random Access Memory (RAM), a CD-ROM, a magnetic tape, a floppy disk and an optical data storage device, and the computer readable recording medium may be realized in a carrier wave form (for example, transition via the Internet). In addition, the computer-readable recording medium is distributed in a computer system connected via a network so that computer-readable codes are stored and executed in a distributed manner. In addition, functional programs, codes and code segments used to embody the present inventive concept may be easily anticipated by programmers in the technical field of the present inventive concept.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for verification of a reconfigurable processor having an initial configuration, the method comprising:
   generating a test description and an architecture description;
   generating a test program based on the architecture description and the test description;
   executing the test program in the reconfigurable processor;
   executing the test program in a simulator; and
   verifying the reconfigurable processor by determining whether a type of an output value and an input value in results of executing the test program in the reconfigurable processor is the same as a type of an output value and input value in results of executing the test program in the simulator.

2. The method of claim 1, wherein the architecture description comprises interconnection between Functional Units (FUs) and a register file in the reconfigurable processor, a register location where a specific type value is stored, and an instruction set of the reconfigurable processor.

3. The method of claim 1, wherein the test description comprises a type and a weight of an instruction to be tested, a test execution cycle length, and a test schedule.

4. The method of claim 3, wherein the generating the test program comprises generating a random test program based on the test description.

5. The method of claim 4, wherein the verifying the reconfigurable processor comprises:
   tracking a value type of the register value and a value type of an output value of functional units (FUs); and
   verifying the reconfigurable processor by comparing the tracked value type of the register value and the tracked value type of the output value of the FUs.

6. The method of claim 5, wherein the verifying of the reconfigurable processor comprises verifying an operation of the reconfigurable processor by comparing the tracked value type of the register value and the tracked value type of the output values of the FUs during a given cycle.

7. The method of claim 1, wherein the type of the input and output values comprises at least an integer type and a float type.

8. A method for verification of a reconfigurable processor having an initial configuration, the method comprising:
   generating a random test program based on an architecture description and a test description;
   executing the random test program in a reconfigurable processor that comprises functional units whose configuration is modifiable in order to optimize the reconfigurable processor for a specific operation;

executing the random test program in a simulator comprising at least one register for simulating the reconfigurable processor; and verifying operation of the reconfigurable processor by determining whether a type of an output value in results after executing the random test program in the reconfigurable processor is the same as a type of an output value in results after executing the random test program in the simulator.

9. The method of claim 8, wherein:

the test description comprises constraints a type and a weight for each of a plurality of test instructions, and the random test program is generated according to a type and a weight of the instructions.

10. The method of claim 9, wherein the architecture description includes interconnections between the functional units of the reconfigurable processor and a register file in the reconfigurable processor, a register location where a specific type value is stored, and an instruction set of the reconfigurable processor.

11. The method of claim 8, wherein the architecture description includes interconnections between the functional units of the reconfigurable processor and a register file in the reconfigurable processor, a register location where a specific type value is stored, and an instruction set of the reconfigurable processor.

12. The method of claim 8, wherein verifying the operation of the reconfigurable processor comprises:

tracking the type of input values and output values of the instructions being executed during execution of the random test program in the reconfigurable processor;

tracking the type of input values and output values of the instructions being executed during execution of the random test program in the simulator; and comparing the types of input values and output values between the reconfigurable processor and the simulator.

13. The method of claim 12, wherein the types of input values and output values of results after execution of the random test program are compared.

14. The method of claim 12, wherein types of input values and output values are compared at a given cycle of execution of the random test program.

15. The method of claim 12, wherein a value type of the register of the simulator and a value type of a functional unit output value of the reconfigurable processor are tracked and compared.

16. The method of claim 8, wherein a value type of the register of the simulator and a value type of a functional unit output value of the reconfigurable processor are compared.

17. The method of claim 8, wherein the type of the output values comprises at least an integer type and a float type.

18. A method for verification of a reconfigurable processor having an initial configuration, the method comprising:

generating an architecture description of the reconfigurable processor;

generating a test description for the reconfigurable processor, the test description including constraints set by a user, wherein the constraints include syntactical information about a plurality of test instructions but do not designate specific values of operands for the instructions;

generating a random test program using the architectural description and the test description;

executing the random test program in the reconfigurable processor;

executing the random test program in a simulator for simulating the reconfigurable processor; and verifying operation of the reconfigurable processor by determining whether a type of an output value in results of executing the random test program in the reconfigurable processor is the same as a type of an output value in results of executing the random test program in the simulator.

19. The method of claim 18, wherein the test description includes constraints set by a user, the constraints comprising a type and a weight of a plurality of test instructions, a test execution cycle length and a test schedule, and the architectural description includes interconnections between function unit of the reconfigurable processor and a register file in a reconfigurable processor, a register location where a specific type value is stored, and an instruction set of the reconfigurable processor.

20. The method of claim 18, wherein the type of the output values comprises at least an integer type and a float type.

* * * * *